United States Patent
Satou et al.

(10) Patent No.: US 7,920,153 B2
(45) Date of Patent: Apr. 5, 2011

(54) NOISE QUANTITY MEASURING APPARATUS

(75) Inventors: Takayuki Satou, Tokyo (JP); Hidetsugu Takahashi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1113 days.

(21) Appl. No.: 11/654,518

(22) Filed: Jan. 18, 2007

(65) Prior Publication Data

US 2007/0182863 A1 Aug. 9, 2007

(30) Foreign Application Priority Data

Feb. 7, 2006 (JP) ................................. 2006-029790

(51) Int. Cl.
*G06K 9/00* (2006.01)
(52) U.S. Cl. ....................... 345/690; 382/162
(58) Field of Classification Search .................. 345/690, 345/88–89; 382/162–169, 271
See application file for complete search history.

(56) References Cited

U.S. PATENT DOCUMENTS

| 5,170,441 A * | 12/1992 | Mimura et al. | ............... 382/165 |
| 5,239,378 A * | 8/1993 | Tsuji et al. | ..................... 348/625 |
| 7,561,204 B1 * | 7/2009 | Honda | .......................... 348/448 |

FOREIGN PATENT DOCUMENTS

JP 2005-229166 8/2005

* cited by examiner

*Primary Examiner* — Amr Awad
*Assistant Examiner* — Andre Matthews
(74) *Attorney, Agent, or Firm* — Studebaker & Brackett PC; Donald R. Studebaker

(57) ABSTRACT

The present invention provides a noise quantity measuring apparatus adaptable to a video input signal subjected to automatic gain control. A luminance determination circuit compares luminance levels of respective pixels constituting a video input signal VIN and a predetermined threshold value for every arbitrary area Ai. If even one of the luminance levels exceeds the threshold value, then the luminance determination circuit outputs a detection signal DET to the corresponding area Ai. Sums SUMi of luminance level differences developed every plural arbitrary areas Ai, which are outputted from an integration circuit, are supplied to a selection circuit, where they are compared with an output signal OUT. Thereafter, each smaller value is supplied to a register. The register holds the output of the selection circuit in accordance with a latch signal LAT supplied from a pulse generator. On the other hand, when the detection signal DET is outputted, the latch signal LAT outputted from the pulse generator is stopped. Thus, the sum of the luminance level differences with respect to each area having pixels whose luminance levels exceed the threshold value, is ignored and eliminated from an output signal OUT indicative of the quantity of noise.

2 Claims, 5 Drawing Sheets

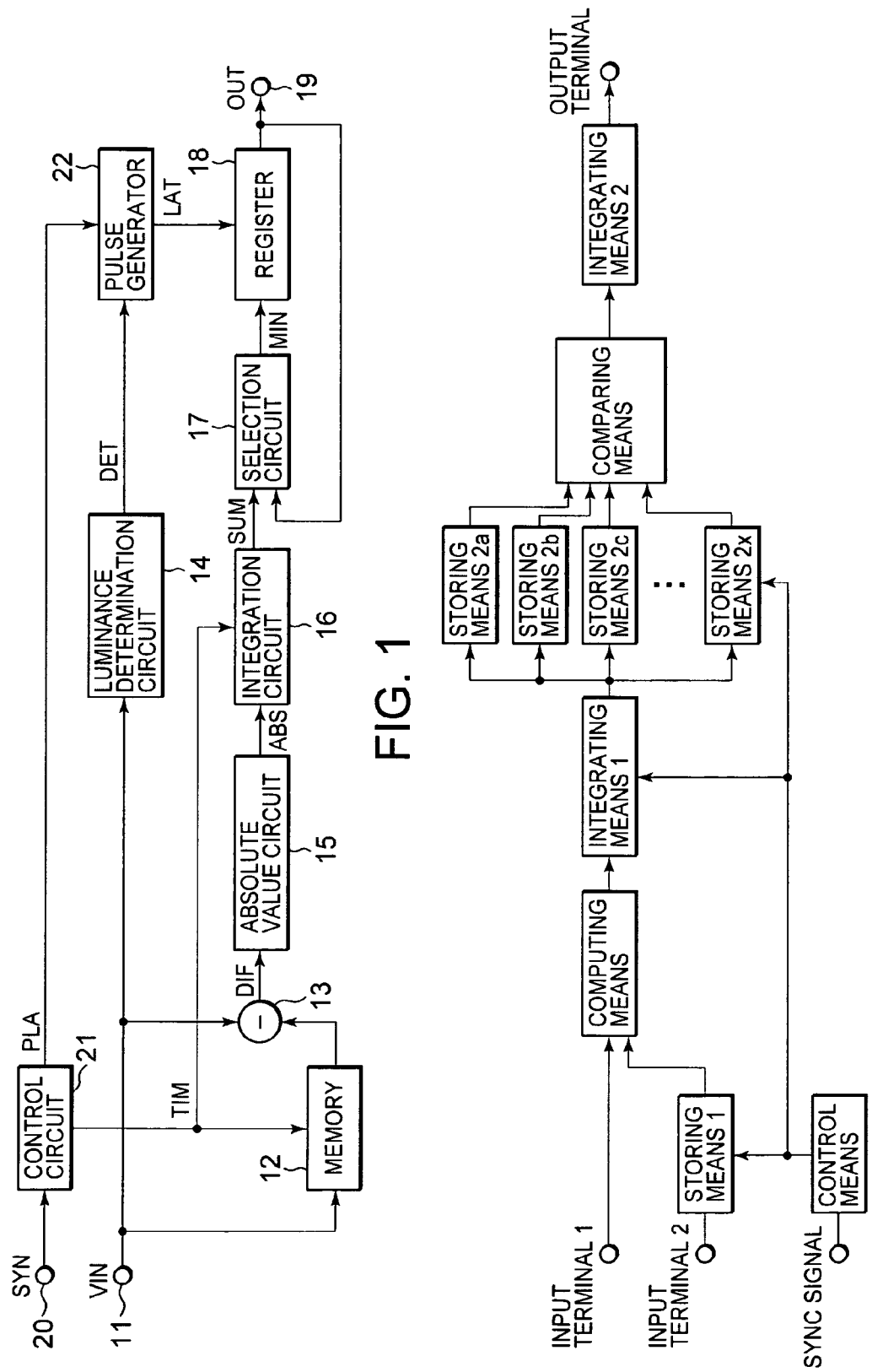

VIDEO SIGNAL

AMPLIFIED
VIDEO SIGNAL

OUTPUT
VIDEO SIGNAL

DECISION SIGNAL

EXTRACTION OF AREA

SIGNAL WAVEFORM

NOISE QUANTITY MEASURING APPARATUS

BACKGROUND OF THE INVENTION

The present invention relates to a technique for measuring the quantity of noise contained in a video signal.

FIG. 2 is a configuration diagram of a conventional noise quantity measuring apparatus described in a patent document 1 (Japanese Unexamined Patent Publication No. 2005-229166).

The noise quantity measuring apparatus extracts, for example, an area A of 10×10 pixels from a first video signal inputted from an input terminal 1 and extracts, for example, an area B of 5×5 pixels corresponding to a set of adjacent pixels with an arbitrary pixel lying in the area A as the center, as a basic image. On the other hand, the first video signal is supplied even to an input terminal 2. The first video signal applied to the input terminal 2 is stored in a storing or memory means 1 and read as a second video signal. Thus, the second video signal assumes a video signal lying immediately before at least one frame from the first video signal.

A computing means calculates differences developed every pixel located in the same position as the area B lying in the extracted basic image and the second video signal. An integrating means 1 determines the sum of the differences and stores the same in a storing means 2a as a correlation value.

Next, the area B is moved by one pixel or plural pixels from side to side and up and down. Similarly, correlation values at their positions are determined and sequentially stored in their corresponding memory or storing means 2b through 2x. A comparing means determines the minimum one of the correlation values stored in the storing means 2a through 2x and supplies the same to an integrating means 2 as the minimum correlation value.

Likewise, the minimum correlation values are determined with respect to all the pixels lying in the area A. The integrating means 2 determines the sum Vn of the minimum correlation values calculated with respect to the respective pixels lying in the area A. The integrating means 2 performs statistical processing of a histogram, a central or medium value, an average value and the like using the value Vn thereby to measure the quantity of noise. Thus, mis-detecting of moving video and a sudden change in image due to a scene change or the like as noise is assumed to be suppressed.

In the noise quantity measuring apparatus, a video signal is divided at a given area, and the minimum value of the differences developed between the video signal and the video signal lying immediately before one frame is determined. Thus, motion based on the differences is suppressed from being mis-detected as noise at the moving video and the image suddenly changed due to the scene change or the like. However, a problem arises in that the noise quantity measuring apparatus cannot adapt to input video of a video camera or the like having an automatic gain control function.

FIG. 3 is a diagram for describing the problems of the conventional noise quantity measuring apparatus.

Assuming that when low-luminance video portions low and high-luminance video portions high are existent in mixed form and noise exists over the whole video as shown in a video signal of FIG. 3(a), for example, a gain control function is operated to bring gain to twice, the luminance level of the high-luminance video portion high exceeds an outputtable range as indicated by an amplified video signal shown in FIG. 3(b). Therefore, the video signal of the high-luminance portion is cut together with a noise component, so that an output video signal assumes a constant value (maximum value) as shown in FIG. 3(c). Thus, when the difference from the video signal lying immediately before one frame is made to determine the minimum value, the difference results in 0 as indicated by a decision signal of FIG. 3(d) because no noise exists in cut portion, so that the noise quantity of each low-luminance video portion low cannot be measured.

SUMMARY OF THE INVENTION

The present invention aims to provide a noise quantity measuring apparatus adaptable to a video input signal subjected to automatic gain control.

According to one aspect of the present invention, for attaining the above object, there is provided a noise quantity measuring apparatus comprising:

a memory circuit which stores therein a video input signal corresponding to at least one frame;

a subtraction circuit which calculates differences in luminance level developed every pixel between video signals in plural arbitrary areas at a newly inputted video input signal and a video signal in the same area read from the memory circuit;

an integration circuit which adds absolute values of the luminance level differences developed every pixel in the arbitrary areas, which have been calculated by the subtraction circuit, every said arbitrary area, and outputs sums of the luminance level differences every said plural arbitrary areas;

a luminance determination circuit which compares the luminance levels of the respective pixels that constitute the video signals and a predetermined threshold value every said arbitrary areas, and outputs a detection signal to the corresponding area if even one of the luminance levels exceeds the threshold value; and a minimum value output circuit which outputs the minimum sum of luminance level differences exclusive of the area for the detection signal outputted from the luminance determination circuit, of the sums of the luminance level differences developed every said plural arbitrary areas, which are outputted from the integration circuit.

In the present invention, the noise quantity measuring apparatus has the luminance determination circuit which compares the luminance levels of the respective pixels that constitute the video signals and the predetermined threshold value every arbitrary area, and outputs the detection signal to the corresponding area if even one of the luminance levels exceeds the threshold value, and the minimum value output circuit which outputs, as the quantity of noise, the minimum sum of luminance level differences exclusive of the area for the detection signal outputted from the luminance determination circuit, of the sums of the luminance level differences every plural arbitrary areas. Thus, data about areas having pixels whose luminance levels exceed the threshold value are removed by automatic gain control. The difference in luminance level at the area having the minimum value, of the areas in which the luminance levels do not exceed the threshold value is outputted as the quantity of noise. Accordingly, an advantageous effect is obtained in that the quantity of noise at a low-luminance video portion can be detected even with respect to the video input signal on which the automatic gain control has been effected.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a configuration diagram of a noise quantity measuring apparatus showing a first embodiment of the present invention;

FIG. 2 is a configuration diagram of a conventional noise quantity measuring apparatus;

DETAILED DESCRIPTION OF THE PREFERRED EMBODIMENT

Figure 3A:
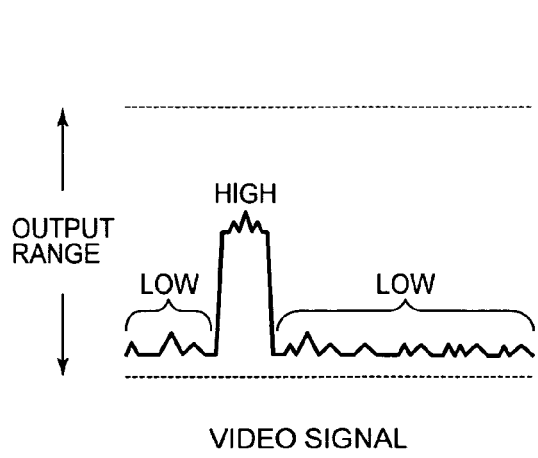
FIGS. 3A-3D are diagrams for describing problems of the conventional noise quantity measuring apparatus.
Figure 3B:
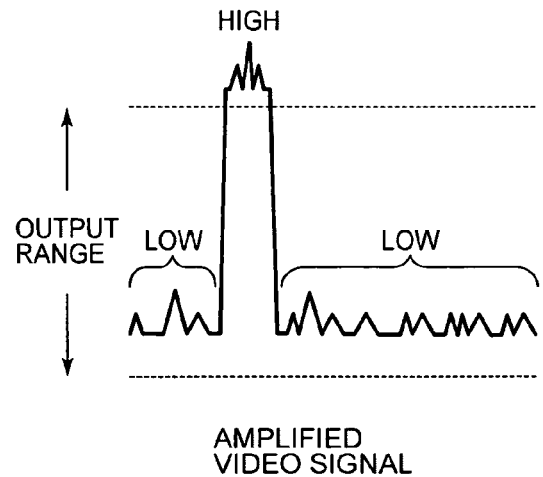
Figure 3C:
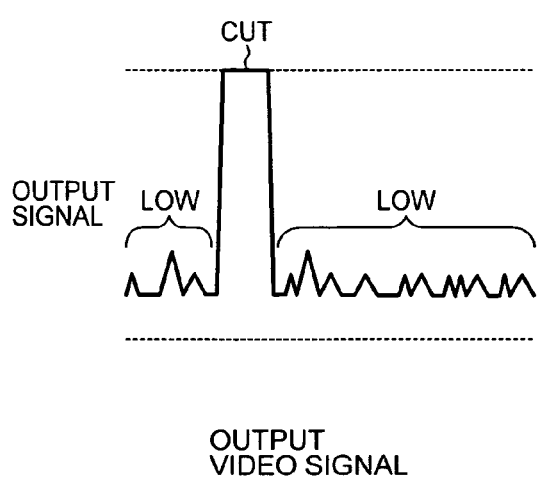
Figure 3D:
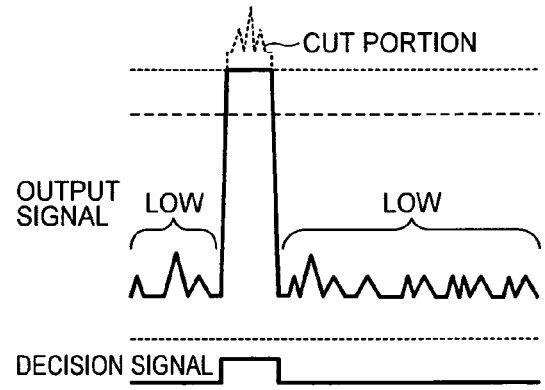

The above and other objects and novel features of the present invention will become more completely apparent from the following descriptions of preferred embodiments when the same is read with reference to the accompanying drawings. The drawings, however, are for the purpose of illustration only and by no means limitative of the invention.

First Preferred Embodiment

FIG. 1 is a configuration diagram showing a noise quantity measuring apparatus according to a first embodiment of the present invention.

The noise quantity measuring apparatus measures the quantity of noise in a vide input signal VIN inputted from an input terminal 11 and includes a memory 12, a subtraction circuit 13 and a luminance determination circuit 14, which are respectively supplied with the video input signal VIN. The memory 12 has a memory or storage capacity that stores the video input signal VIN corresponding to at least one frame therein, and outputs the stored video input signal VIN with being delayed by at least one frame. The subtraction circuit 13 calculates each luminance level difference DIF developed every pixel between a video input signal VIN newly inputted from the input terminal 11 and the video signal delayed by at least one frame by the memory 12. The luminance determination circuit 14 outputs a detection signal DET when the video input signal VIN exceeds a threshold value set in advance.

An absolute value circuit 15, which outputs an absolute value ABS of a luminance level difference DIF for each pixel, is connected to the output side of the subtraction circuit 13. Further, an integration circuit 16 is connected to the output side of the absolute value circuit 15. The integration circuit 16 cumulatively adds absolute values ABS every pixel and outputs the sum SUM thereof. The output side of the integration circuit 16 is connected to the first input side of a selection circuit 17. The selection circuit 17 constitutes a minimum value output circuit in combination with a register 18 connected to its output side. The selection circuit 17 selects a small value MIN from within the sum SUM applied to its first input side and an output signal OUT applied to its second input side and outputs the same therefrom. The register 18 holds the small value MIN selected by the selection circuit 17 therein in accordance with a latch signal LAT. The value retained in the register 18 is outputted from an output terminal 19 as an output signal OUT indicative of the quality of noise and fed back to the second input side of the selection circuit 17.

The noise quantity measuring apparatus further includes an input terminal 20 supplied with a sync signal SYN corresponding to the video input signal VIN. A control circuit 21 is connected to the input terminal 20. The control circuit 21 generates a timing signal TIM corresponding to each pixel intended for comparison, based on the sync signal SYN inputted from the input terminal 20 and supplies the same to the memory 12 and the integration circuit 16, and generates a prelatch signal PLA every constant area intended for comparison. The prelatch signal PLA is supplied to a pulse generator 22.

The pulse generator 22 outputs the prelatch signal PLA to the register 18 as a latch signal LAT when the detection signal DET is not supplied to the luminance detection circuit 14, and stops the output of the latch signal LAT when the detection signal DET is applied thereto.

FIG. 4 is a diagram for describing the operation of the noise quantity measuring apparatus shown in FIG. 1. The operation of FIG. 1 will be explained below with reference to FIG. 4.

Figure 4A:
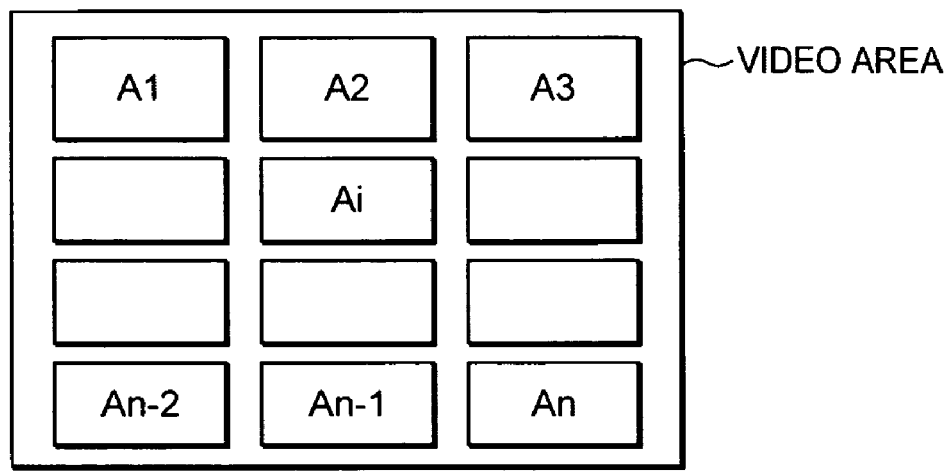
FIGS. 4A-4B are diagrams for describing the operation of the noise quantity measuring apparatus shown in FIG. 1.

As shown in FIG. 4(a), arbitrary n areas A1 through An are first extracted from a video input signal VIN inputted from the input terminal 11. Incidentally, the number of pixels extracted at each of the areas A1 through An is also optional.

Next, the luminance levels of pixels at the same positions lying in the memory 12 are read corresponding to all pixels lying within the area A1 in accordance with a timing signal TIM outputted from the control circuit 21. Further, pixel's luminance level differences DIF are calculated every pixel by the subtraction circuit 13. Further, the luminance level differences DIF are brought to absolute values ABS by the absolute value circuit 15, which in turn are cumulatively added by the integration circuit 16 in accordance with the timing signal TIM to determine a sum SUM1. Similar processing is effected even on the areas A2 through An to determine sums SUM2 through SUMn.

On the other hand, the luminance determination circuit 14 determines whether pixels whose luminance levels respectively exceed a threshold value determined in advance exist within the areas A1 through An extracted from the video input signal VIN for every areas A1 through An. If even one of such pixels that their luminance levels exceed the threshold value is included within the areas, then the luminance determination circuit 14 outputs a detection signal DET to its corresponding area Ai.

Figure 4B:
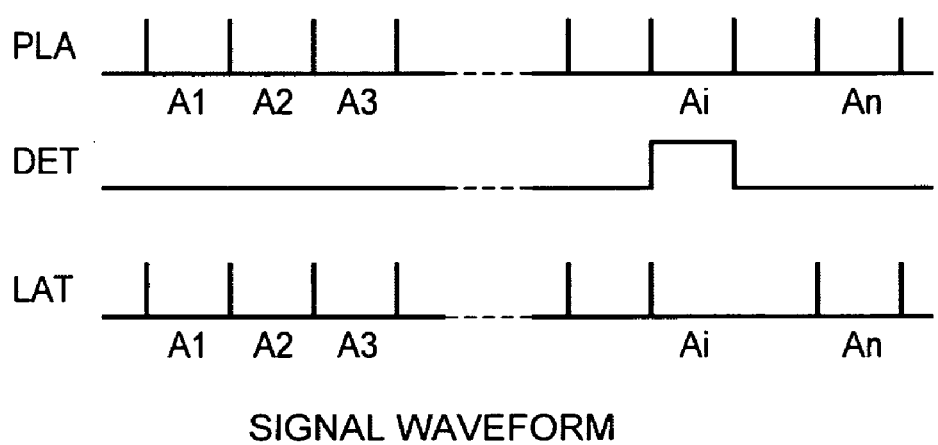

As shown in FIG. 4(b), the control circuit 21 generates a prelatch signal PLA in sync with timing provided to end accumulative addition of the areas A1 through An. The prelatch signal PLA is supplied to the pulse generator 22, where mask processing based on the detection signal DET is performed. That is, if the detection signal DET has been outputted to a given area Ai, then a latch signal LAT relative to the area Ai is not outputted.

The sums SUM1 through SUMn corresponding to the respective areas A1 through An, which have been determined by the integration circuit 16, are supplied to the minimum value output circuit constituted of the selection circuit 17 and the register 18. That is, the maximum value (e.g., 255 if a 8-bit register is taken) holdable in the register 18 as an initial value is set to the register 18. The selection circuit 17 compares an output signal OUT outputted from the register 18 and the sums SUM1 through SUMn sequentially outputted from the integration circuit 16 with one another, from which small values MIN are supplied to the register 18. Further, each value MIN outputted from the selection circuit 17 is held in the register 18 in accordance with the latch signal LAT supplied from the pulse generator 22. Thus, the values retained in the register 18 are sequentially updated to smaller values.

At this time, the sum SUMi at the area Ai having pixels for a high-luminance vide portion high at which the luminance exceeds the threshold value, is excluded without being stored in the register 18 because the prelatch signal LAT is masked with the detection signal DET and the latch signal LAT is not outputted. Thus, after the completion of processing on all the areas A1 through An, the output signal OUT indicative of the quantity of noise outputted from the register 18 assumes the smallest value in the sums SUM1 through SUMn except for data about each high-luminance video portion exceeding the threshold value.

As described above, the noise quantity measuring apparatus according to the first embodiment includes the luminance determination circuit 14 which outputs the detection signal DET when the video input signal VIN exceeds the threshold value set in advance, and the pulse generator 22 for stopping the process of updating the minimum value at the minimum value output circuit (selection circuit 17 and register 18) when the detection signal DET is outputted. Thus, the noise quantity measuring apparatus has an advantage in that even when noise exists in the whole video in which low-luminance and high-luminance visuals or pictures are existent in mixed form at a video input signal VIN of a video camera or the like having an automatic gain control function, and luminance levels are saturated by gain control so that the high-luminance video portion exceeds an output range and part of the high-luminance video portion is cut together with noise, the quantity of noise in the low-luminance video portion can be detected.

Second Preferred Embodiment

Figure 5:
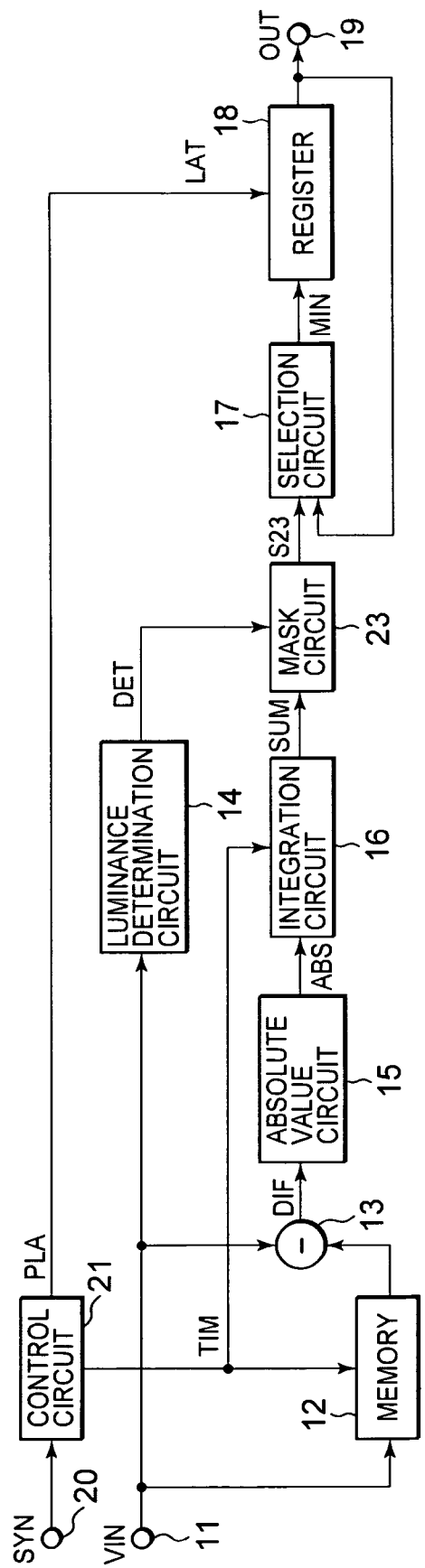
FIG. 5 is a configuration diagram illustrating a noise quantity measuring apparatus according to a second embodiment of the present invention.

FIG. 5 is a configuration diagram showing a noise quantity measuring apparatus according to a second embodiment of the present invention. Constituent elements common to those shown in FIG. 1 are respectively given common reference numerals.

The noise quantity measuring apparatus is configured in such a manner that the pulse generator 22 shown in FIG. 1 is omitted, and that a control circuit 21 applies a prelatch signal PLA outputted therefrom to a register 18 as a latch signal LAT as it is, and a mask circuit 23 is provided between an integration circuit 16 and a selection circuit 17 and controlled by a detection signal DET outputted from a luminance determination circuit 14. When the detection signal DET is supplied to the mask circuit 23, the mask circuit 23 outputs a maximum value (e.g., 255 if a 8-bit integration circuit is taken) outputtable from the integration circuit 16 regardless of each value outputted from the integration circuit 16. Incidentally, when the detection signal DET is not supplied to the mask circuit 23, the mask circuit 23 outputs the value outputted from the integration circuit 16 as it is. The present noise quantity measuring apparatus is similar in other configuration to one shown in FIG. 1.

The operation of the noise quantity measuring apparatus is similar to that of the noise quantity measuring apparatus shown in FIG. 1 except for the operation of determining the minimum value in each of sums SUM1 through SUMn outputted from the integration circuit 16.

Figure 6:
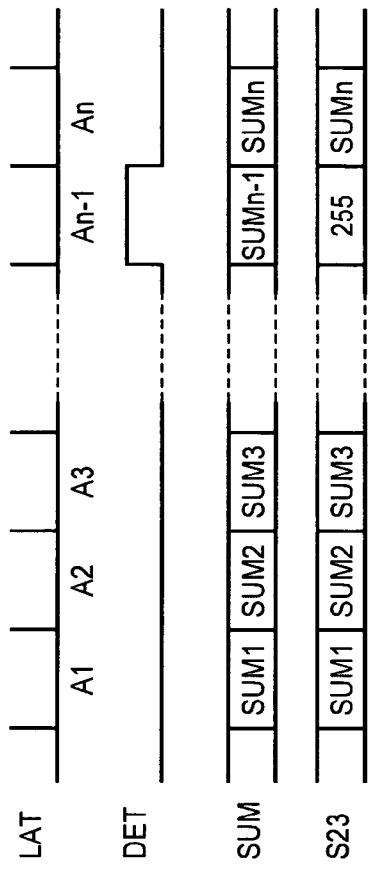
FIG. 6 is a signal waveform diagram showing the operation of the noise quantity measuring apparatus shown in FIG. 5.

FIG. 6 is a signal waveform diagram showing the operation of the noise quantity measuring apparatus shown in FIG. 5.

In the noise quantity measuring apparatus, as shown in FIG. 6, when a sum SUMi is outputted from the integration circuit 16 in association with an area Ai, the sum SUMi is outputted from the mask circuit 23 as an output signal S23 as it is if no detection signal DET is supplied from the luminance determination circuit 14. If the detection signal DET is being supplied, then the value of the output signal S23 produced from the mask circuit 23 becomes 255 regardless of the value of the sum SUMi. Thus, each value MIN selected by the selection circuit 17 results in its corresponding value held in the register 18, and the contents held in the register 18 remains unchanged. That is, the sum SUMi corresponding to the output of the integration circuit 16 at the area Ai in which the detection signal DET is outputted, is not reflected on an output signal OUT.

Thus, since the noise quality measuring apparatus according to the second embodiment has the luminance determination circuit 14 which outputs the detection signal DET when the video input signal VIN exceeds the threshold value set in advance, and the mask circuit 23 which masks the output of the integration circuit 16 when the detection signal DET is outputted, the noise quality measuring apparatus has an advantage similar to the first embodiment.

Incidentally, the present invention is not limited to the above embodiments, and various changes can be made. As modified examples therefor, may be mentioned, such ones as shown next.

Figure 7:
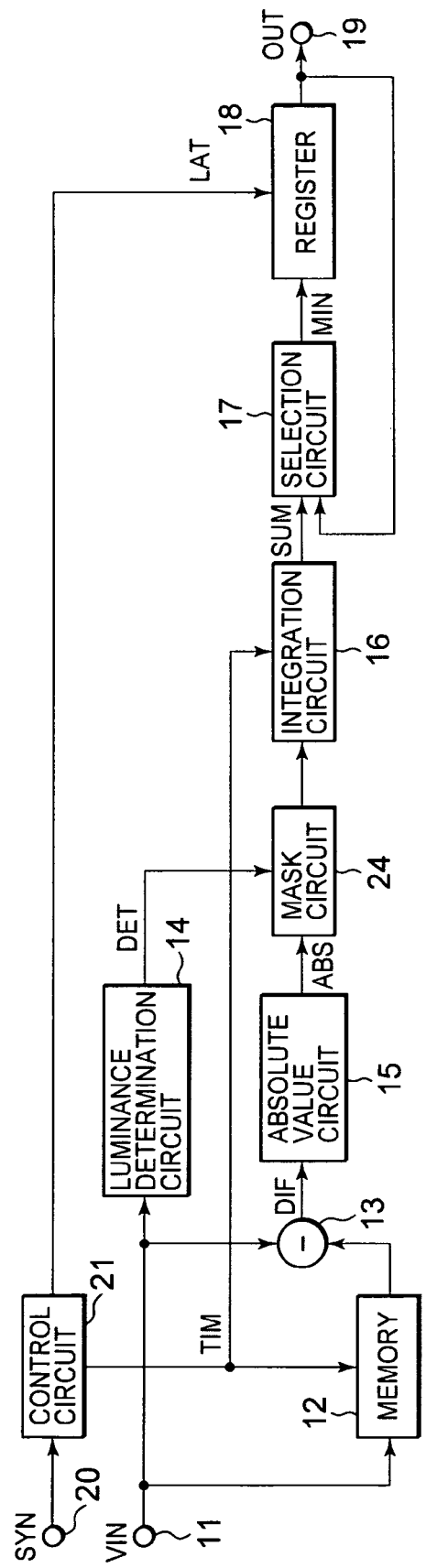
FIG. 7 is a configuration diagram showing a noise quantity measuring apparatus according to another embodiment.

(1) FIG. 7 is a configuration circuit showing a noise quantity measuring apparatus according to another embodiment.

In the present noise quantity measuring apparatus, a mask circuit 24 is inserted between an absolute value circuit 15 and an integration circuit 16 and configured in such a way as to mask an absolute value ABS outputted from the absolute value circuit 15 when a detection signal DET is outputted from a luminance determination circuit 14.

(2) The configuration of a minimum value output circuit is not limited to the configurations shown in FIGS. 1, 5 and 7. In FIG. 1, for example, the selection circuit 17 that selects the small value MIN, and the register 18 that holds the value MIN selected by the selection circuit 17 therein in accordance with the latch signal LAT and thereby updates the value to small values sequentially are used as for the minimum value output circuit which outputs the minimum value of the sums SUM1 through SUMn. However, registers which hold sums SUM1 through SUMn (where sums for areas intended for detection signal DET are excluded) for respective areas A1 through An, which are outputted from the integration circuit 16, and a selection circuit which selects the minimum value of the sums SUM1 through SUMn held in these registers and outputs an output signal OUT, can be used as for the minimum value output circuit.

What is claimed is:
1. A noise quantity measuring apparatus comprising:
   a memory circuit which stores therein a video input signal corresponding to at least one frame;
   a subtraction circuit which calculates differences in luminance level developed every pixel between video signals in plural arbitrary areas at a newly inputted video input signal and a video signal in the same area read from the memory circuit;
   an integration circuit which adds absolute values of the luminance level differences developed every pixel in the arbitrary areas, which have been calculated by the subtraction circuit, every said arbitrary area, and outputs sums of the luminance level differences every said plural arbitrary areas;
   a luminance determination circuit which compares the luminance levels of the respective pixels that constitute the video signals and a predetermined threshold value every said arbitrary areas, and outputs a detection signal to the corresponding area if even one of the luminance levels exceeds the threshold value; and a minimum value output circuit which outputs the minimum sum of luminance level differences exclusive of the area for the detection signal outputted from the luminance determination circuit, of the sums of the luminance level differences developed every said plural arbitrary areas, which are outputted from the integration circuit;

wherein the minimum value output circuit comprises:

a control circuit which outputs a prelatch signal with a timing provided to calculate the whole sum of luminance level differences every said arbitrary area, a pulse generator which outputs a latch signal with same timing as the prelatch signal when the detection signal is not outputted, and stops the output of the latch signal when the detection signal is outputted, a selection circuit which compares the sums of the luminance level differences developed every said arbitrary area, which are supplied to a first input side from the integration circuit, and a value supplied to a second input side, and selects and outputs smaller values, and a register to which a maximum value is set as an initial value, said register sequentially holding the smaller values selected and outputted from the selection circuit in accordance with the latch signal and supplying the same to the second input side of the selection circuit to thereby update the held values, and outputting the sum of the luminance level differences, which is minimum within said arbitrary areas, as the quality of noise.

2. A noise quantity measuring apparatus comprising:

a memory circuit which stores therein a video input signal corresponding to at least one frame;

a subtraction circuit which calculates differences in luminance level developed every pixel between video signals in plural arbitrary areas at a newly inputted video input signal and a video signal in the same area read from the memory circuit;

an integration circuit which adds absolute values of the luminance level differences developed every pixel in the arbitrary areas, which have been calculated by the subtraction circuit, every said arbitrary area, and outputs sums of the luminance level differences every said plural arbitrary areas;

a luminance determination circuit which compares the luminance levels of the respective pixels that constitute the video signals and a predetermined threshold value every said arbitrary areas, and outputs a detection signal to the corresponding area if even one of the luminance levels exceeds the threshold value; and a minimum value output circuit which outputs the minimum sum of luminance level differences exclusive of the area for the detection signal outputted from the luminance determination circuit, of the sums of the luminance level differences developed every said plural arbitrary areas, which are outputted from the integration circuit;

wherein the minimum value output circuit comprises:

a control circuit which outputs a latch signal with a timing provided to calculate the whole sum of luminance level differences every said arbitrary area, a mask circuit which outputs the sums of the luminance level differences developed every said arbitrary areas, which are outputted from the integration circuit when the detection signal is not outputted, and outputs a maximum value in place of the output from the integration circuit when the detection signal is outputted, a selection circuit which compares the sums of the luminance level differences developed every said arbitrary areas, which are supplied to a first input side from the integration circuit, and a value supplied to a second input side, and selects and outputs smaller values, and a register to which a maximum value is set as an initial value, said register sequentially holding the smaller values selected and outputted from the selection circuit in accordance with the latch signal and supplying the same to the second input side of the selection circuit to thereby update the held values, and outputting the sum of the luminance level differences, which is minimum within the arbitrary areas, as the quality of noise.

* * * * *